US000001220H

United States Statutory Invention Registration [19]

[11] Reg. Number: H1220

Pease

[43] Published: Aug. 3, 1993

[54] VLF-VHF BROADBAND IN LINE AMPLIFIER FOR SUBMARINE ANTENNAS

[75] Inventor: Brian L. Pease, Oakdale, Conn.

[73] Assignee: The United States of America as represented by the Secretary of the Navy, Washington, D.C.

[21] Appl. No.: 903,293

[22] Filed: Jun. 24, 1992

[51] Int. Cl.[5] ..... H01Q 1/04

[52] U.S. Cl. ..... 343/709; 343/719; 455/278.1; 455/286; 330/306

[58] Field of Search ..... 330/306; 343/709, 719

[56] References Cited

U.S. PATENT DOCUMENTS 4,760,348 7/1988 Pease et al. ..... 330/306
4,774,519 9/1988 Pease et al. ..... 343/709

*Primary Examiner*—Bernarr E. Gregory
*Attorney, Agent, or Firm*—Michael J. McGowan; Prithvi C. Lall; Michael F. Oglo

[57] ABSTRACT

A VLF-VHF broadband in-line amplifier forms a portion of a towable buoyant cable antenna system that is deployed in seawater from submarines. The amplifier is located between an antenna system and a coaxial cable. The coaxial cable is connected to the submarine. The VLF-VHF broadband in-line amplifier provides substantially uniform amplification for the frequency range of 10 kHz–160 MHz on signals received from the antenna system. The amplified signals are then transmitted to the submarine over the coaxial cable.

8 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VLF-VHF BROADBAND IN LINE AMPLIFIER FOR SUBMARINE ANTENNAS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention is a VLF-VHF broadband in-line amplifier. This amplifier is part of a towed buoyant cable antenna system that is deployed in seawater from a submarine. The towed buoyant cable antenna system is comprised of the VLF-VHF broadband in-line amplifier connected between a buoyant antenna element and a buoyant coaxial cable. The buoyant coaxial cable extends inward toward a submarine from the VLF-VHF broadband in-line amplifier.

The VLF-VHF in-line amplifier is designed to operate on the frequencies of interest. These frequencies are those between 10 kHz–160 MHz. The frequencies referred to in the specification are as follows: VLF (very low frequency) 3–30 kHz, LF (low frequency) 30–300 kHz, MF (medium frequency) 300 kHz–3 MHZ, HF (high frequency) 3–30 MHz, and VHF (very high frequency) 30–300 MHz.

(2) Description of the Prior Art

Present amplifiers are capable of only amplifying the higher frequencies. In the VLF/LF range the signals are passed without amplification due to the limitations of the thin film amplifier modules used. Such a system is described by Pease et al. in U.S. Pat. No. 4,760,348 titled Broadband In-Line Amplifier for Submarine Antennas. The Pease et al. system, in which I was a co-inventor also has the problem that it is somewhat complex requiring several miniature inductors and capacitors to separate and combine the DC power and VLF/LF signals with the higher frequencies.

SUMMARY OF THE INVENTION

Accordingly, it is a general purpose and object of the present invention to provide an improved broadband in-line amplifier with acceptable gain and sensitivity across the entire 10 kHz–160 MHz range. It is a further object that the VLF/LF signals are not degraded by shipboard EMI as were the unamplified signals of the aforementioned prior art system. Another object is to simplify the circuitry and use no inductors.

These and other objects are accomplished with the present invention by providing an amplifier that is deployed in seawater, from a submarine, inboard of an antenna system and utilizes a pair of transistor amplifiers to provide a substantially uniform gain over a frequency range of interest. The amplifiers receive DC power over a coaxial cable that is located inboard of the amplifier and connected to the submarine.

DESCRIPTION OF THE PREFERRED EMBODIMENT

Figure 1:
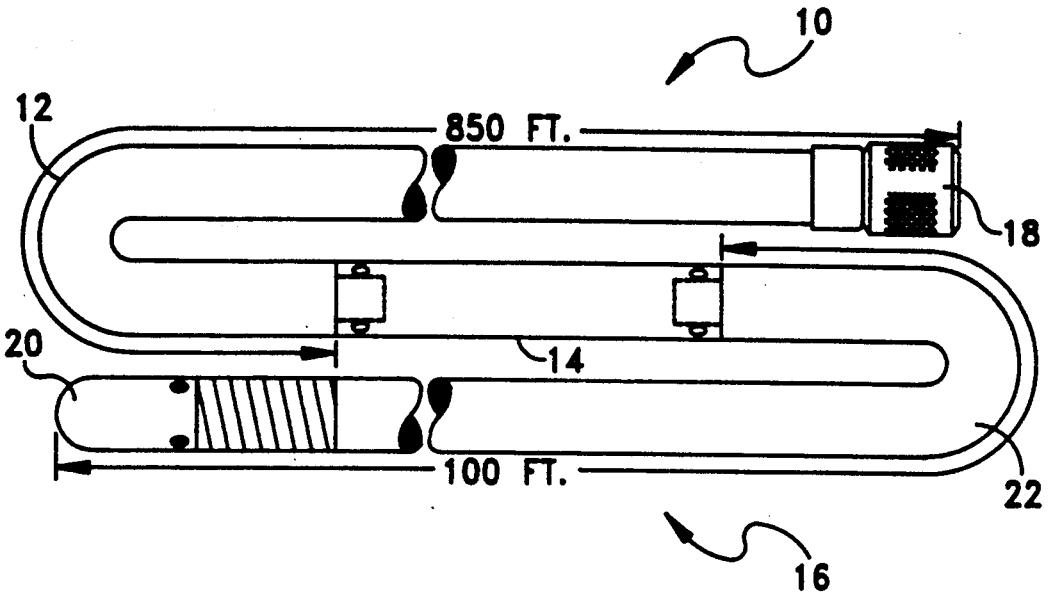
FIG. 1 is a pictorial representation of a buoyant antenna system in accordance with the present invention.

Referring now to FIG. 1 there is shown a buoyant cable antenna system 10 that is designed to be towed in seawater during operations. The buoyant cable antenna system 10 is comprised of a coaxial cable 12, a VLF-VHF broadband in-line amplifier 14, and a buoyant antenna element 16.

The coaxial cable 12 has at one end a connector 18 for mating with a connector on a submarine. The cable 12 at its other end connects to one end of the VLF-VHF broadband in-line amplifier 14. The VLF-VHF broadband amplifier 14 at its other end connects to one end of the buoyant antenna element 16. The buoyant antenna element 16 is comprised of a metallic termination tip 20 and a length of single conductor buoyant cable 22. The termination tip 20 functions as an electrical ground to the seawater and is located on the end of the buoyant antenna element 16 outward from the submarine.

Figure 2:
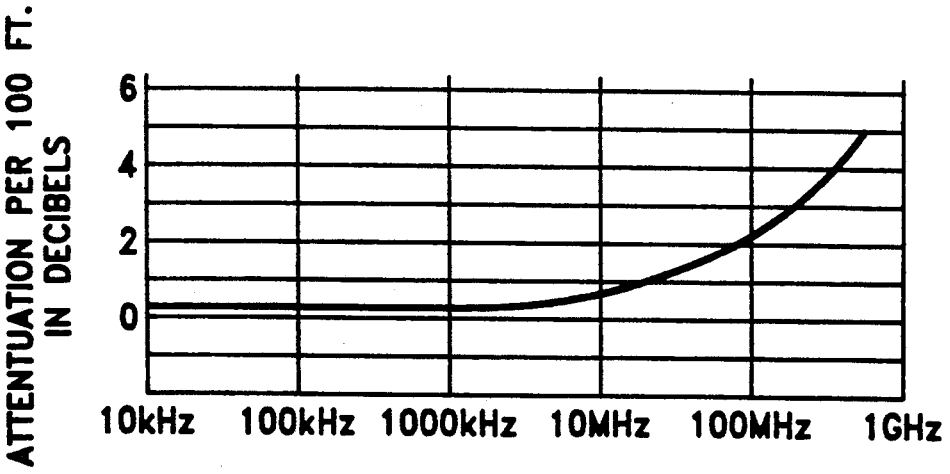
FIG. 2 is a graphical representation of the attenuation vs frequency in the buoyant coaxial cable of FIG. 1.

FIG. 2 shows a graph of the signal attenuation in the cable vs frequency per 100 feet in an RG-384 cable. The RG-384 cable is a typical coaxial type cable used in conducting signals to a submarine from a towed antenna system deployed in water. The RG-384 cable is suitable for use as the coaxial cable 12 of FIG. 1. It is to be noted that the attenuation in the cable increases as the frequency rises.

Figure 3:
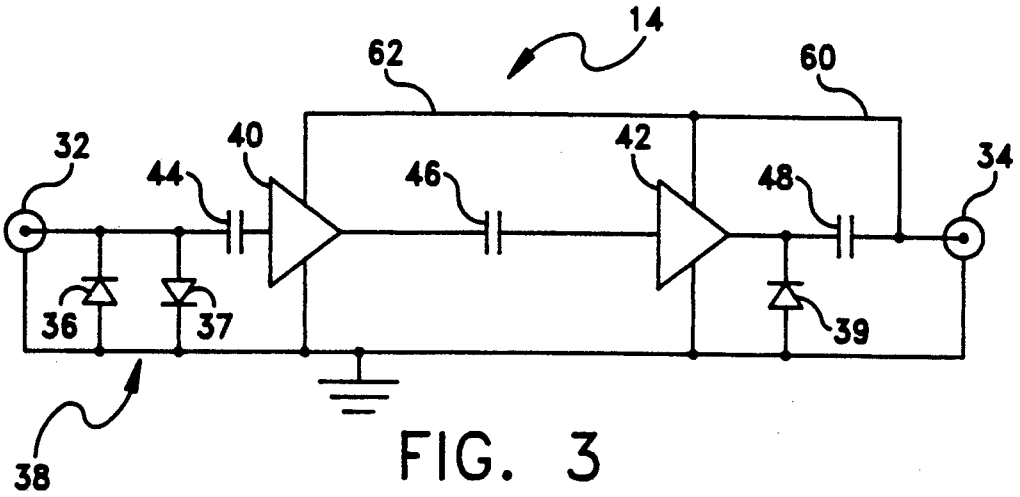
FIG. 3 is a schematic diagram of the broadband in-line amplifier system of FIG. 1.

Referring to FIG. 3, the schematic diagram shows the components of the VLF-VHF broadband in-line amplifier 14. The broadband amplifier 14 has RF input and output terminals 32 and 34, respectively. A pair of overload/impulse protection diodes 36 and 37 form a protection circuit 38 and are located between the RF input terminal 32 and ground and a single diode 39 between the output of amplifier 42 and ground protects the output. The VLF-VHF amplification system is comprised mainly of the individual amplifiers 40 and 42. Each amplifier 40 and 42 has identical schematics comprising a one stage thin-film or integrated circuit amplifier with 50 ohm input and output impedances.

Figure 4:
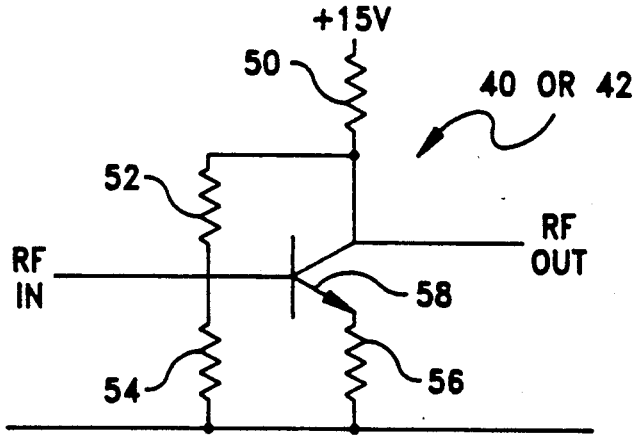
FIG. 4 is a more detailed schematic diagram of the individual amplifiers of FIG. 3.

FIG. 4 shows a schematic representation of one of the two amplifiers 40 and 42. The resistors 50, 52, 54, and 56 provide biasing and feedback for the transistor 58.

Refer now to both FIGS. 3 and 4. The capacitors 44, 46, and 48 couple VLF-VHF signals into and out of amplifiers 40 and 42 while acting as DC blocks. A 15 volt DC power supply is received at terminal 34 from the submarine. The wire 60 carries the 15 volt DC power supply from terminal 34 to amplifier 42 through resistor 50. No signal Current flows in resistor 50 due to the presence of coupling capacitor 48 which acts as a shunt. Wire 62 carries 15 volt DC power and unwanted VLF-VHF output signals to amplifier 40 through resistor 50. These negative feedback signals are attenuated approximately 34 db by resistor 50 of amplifier 40 prior to reaching the input of amplifier 42 through capacitor 46. The gain of amplifier 42 is reduced by about 1 db by the action of negative feedback through wire 62, resistor 50 and capacitor 46. The overall gain of in-line amplifier 14 is 27 db at 10 kHz and 29 db at 160 MHz with a noise figure of about 5 db at normal ambient temperatures.

Figure 5:
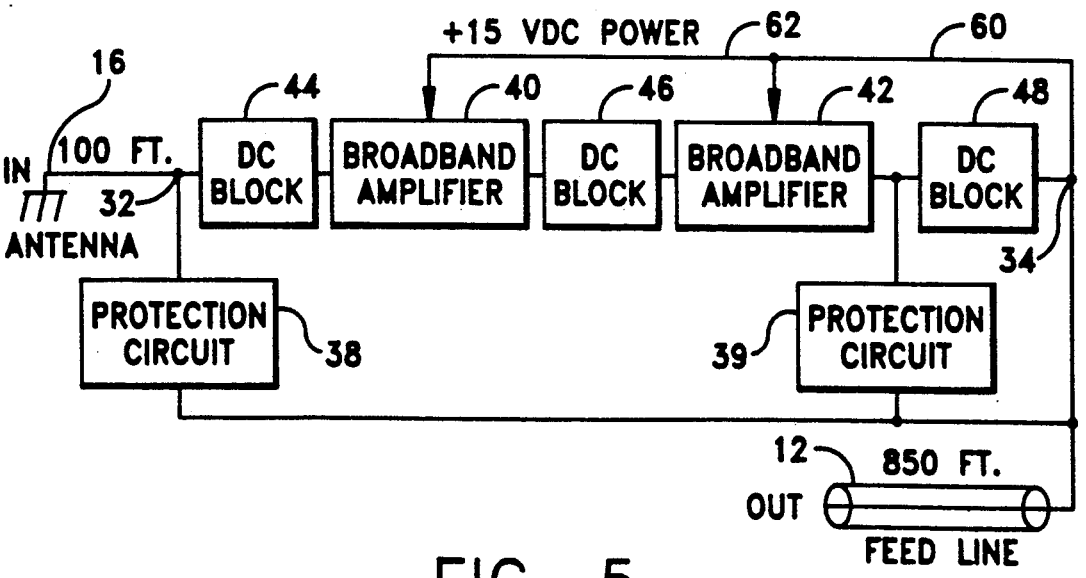
FIG. 5 is a block diagram of the buoyant antenna system of FIG. 1.

FIG. 5 shows a block diagram of a complete buoyant cable antenna incorporating the amplifier 14 of FIG. 3. The blocks in FIG. 5 are made up of components listed previously in one of the other figures. The blocks in FIG. 5 retain the same numeral as that given previously although the wording of some of the components is changed. An example of this is that DC block 44 in FIG. 5 is the same as capacitor 44 in FIG. 3.

10 kHz–160 MHZ signals received on the 100 foot antenna 16 are fed to RF input terminal 32 of the in-line amplifier 14 which boosts the signals an average of 28 db. 15 volt DC power is supplied over the same coaxial feed line 12 that carries the VLF-VHF signals to the submarine. The VLF/LF signals arrive at the submarine virtually unattenuated by the coaxial feedline 12 as shown in the graph of FIG. 2, and above the level of VLF/LF Electromagnetic Interference (EMI) on board the ship. The amplifier 14 has sufficient gain to overcome the loss of the coaxial feedline 12 up to 160 MHz. There is no significant EMI above the VLF/LF bands.

There has therefore been described an improved broadband in-line amplifier 14 for submarine antennas. The system is capable of looking at the full spectrum of received signals or of any discrete band within the range received. It eliminates problems associated with undesirable fluctuations and noise. It further determines if the received signals are random or true signals.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A VLF-VHF broadband in-line amplifier comprising:

an input terminal and an output terminal;

amplification means connected to receive RF signals from said input terminal, said amplification means for amplifying with a substantially uniform gain and sensitivity said received RF signals from 10 kHz–160 MHz, said amplification means comprises two amplifiers with each of said amplifiers having a transistor, said two amplifiers having DC blocking capacitors on inputs and outputs thereof; and circuit means for obtaining DC power for each of said two amplifiers from said output terminal comprising decoupling resistors connected between said output terminal and the collectors of each transistor of said two amplifiers.

2. A VLF-VHF broadband in-line amplifier according to claim 1 further comprising:

at least one impulse protection diode connected at said input terminal; and at least one impulse protection diode connected at said output terminal.

3. A VLF-VHF broadband in-line amplifier according to claim 2 wherein each of said amplifiers comprises an integrated circuit amplifier.

4. A VLF-VHF broadband in-line amplifier according to claim 2 wherein each of said amplifiers comprises a thin film amplifier.

5. A buoyant cable antenna system comprising:

a metallic termination tip;

a first buoyant cable having one end connected to said metallic termination tip;

a VLF-VHF broadband in-line amplifier comprising an input and an output terminal with said input terminal connected to the other end of said first buoyant cable, said VLF-VHF broadband in-line amplifier further comprising amplification means connected to receive RF signals from said input terminal, said amplification means for amplifying with a substantially uniform gain and sensitivity said received RF signals from 10 kHz–160 MHz, said amplification means comprises two amplifiers with each of said amplifiers having a transistor, said amplifiers having DC blocking capacitors on inputs and outputs, and circuit means for obtaining DC power for each of said two amplifiers from said output terminal, said circuit means comprising decoupling resistors connected between said output terminal and the collectors of each transistor of said two amplifiers; and a second buoyant cable, said second buoyant cable being coaxial and having one end connected to said output terminal of said VLF-VHF broadband in-line amplifier, said second buoyant cable supplying said DC power to said output terminal of said VLF-VHF broadband in-line amplifier and for receiving said RF signals from said output terminal of said VLF-VHF broadband in-line amplifier.

6. A buoyant cable antenna system according to claim 5 wherein said VLF-VHF broadband in-line amplifier further comprises:

at least one impulse protection diode connected at said input terminal; and at least one impulse protection diode connected at said output terminal.

7. A buoyant cable antenna system according to claim 6 wherein each of said amplifiers of said VLF-VHF broadband in-line amplifier comprises an integrated circuit amplifier.

8. A buoyant cable antenna system according to claim 6 wherein each of said amplifiers of said VLF-VHF broadband in-line amplifier comprises a thin film amplifier.

* * * * *